(12) United States Patent
Mohan

(10) Patent No.: US 9,616,815 B2
(45) Date of Patent: Apr. 11, 2017

(54) VEHICLE INTERIOR REARVIEW MIRROR ASSEMBLY WITH ACTUATOR

(71) Applicant: MAGNA MIRRORS OF AMERICA, INC., Holland, MI (US)

(72) Inventor: Jake A. Mohan, Grand Rapids, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 237 days.

(21) Appl. No.: 14/616,772

(22) Filed: Feb. 9, 2015

(65) Prior Publication Data

US 2015/0224932 A1  Aug. 13, 2015

Related U.S. Application Data

(60) Provisional application No. 61/937,740, filed on Feb. 10, 2014.

(51) Int. Cl.

| | |
|---|---|
| *G02B 5/08* | (2006.01) |
| *G02B 17/00* | (2006.01) |
| *B60R 1/08* | (2006.01) |
| *B60R 1/04* | (2006.01) |
| *B60R 1/02* | (2006.01) |
| *G02B 17/04* | (2006.01) |

(Continued)

(52) U.S. Cl.
CPC ............... *B60R 1/086* (2013.01); *B60R 1/025* (2013.01); *B60R 1/04* (2013.01); *B60R 1/087* (2013.01); *G02B 17/04* (2013.01); *G02F 1/13318* (2013.01); *G02F 1/153* (2013.01)

(58) Field of Classification Search
CPC  B60R 1/086; B60R 1/025; B60R 1/04; B60R 1/087; B60R 1/02; B60R 1/08087; B60R 1/088; G02B 17/04; G02F 1/13318; G02F 1/153
USPC ....... 359/876, 871, 850, 207.8, 211.1, 223.1, 359/606, 603, 604, 601, 872
See application file for complete search history.

(56) References Cited

U.S. PATENT DOCUMENTS

| | | | |
|---|---|---|---|
| 5,305,012 A | * | 4/1994 | Faris ..................... A61F 9/023 345/7 |
| 5,900,999 A | | 5/1999 | Huizenga et al. |
| 5,986,364 A | | 11/1999 | Bingle et al. |

(Continued)

*Primary Examiner* — Bumsuk Won
*Assistant Examiner* — Collin X Beatty
(74) *Attorney, Agent, or Firm* — Gardner, Linn, Burkhart & Flory, LLP

(57) ABSTRACT

An interior rearview mirror assembly for a vehicle includes a mounting structure configured to mount to an interior portion of a vehicle, a housing, a reflective element disposed at the housing and an actuator disposed in the housing and connected to the reflective element. The actuator includes a first motor connected to the reflective element via a first drive element and a second motor connected to the reflective element via a second drive element. Responsive to an input, the actuator may be operable to adjust an orientation of the reflective element in tandem with the housing relative to the mounting structure. The first and second motors may operate in tandem to adjust the orientation of the reflective element and the housing relative to the mounting structure. The actuator may adjust the reflective element responsive to a user input, a glare sensor and/or a driver eye tracking system of the vehicle.

15 Claims, 14 Drawing Sheets

(51) Int. Cl.
*G02F 1/133* (2006.01)
*G02F 1/153* (2006.01)

(56) References Cited

U.S. PATENT DOCUMENTS

| | | |
|---|---|---|
| 6,213,612 B1 | 4/2001 | Schnell et al. |
| 6,229,226 B1 | 5/2001 | Kramer et al. |
| 6,243,218 B1 | 6/2001 | Whitehead |
| 6,362,548 B1 | 3/2002 | Bingle et al. |
| 6,467,920 B2 | 10/2002 | Schnell et al. |
| 6,685,864 B2 | 2/2004 | Bingle et al. |
| 6,698,905 B1 | 3/2004 | Whitehead |
| 6,755,544 B2 | 6/2004 | Schnell et al. |
| 6,786,610 B2 * | 9/2004 | Faris ................. A61F 9/065 359/601 |
| 6,916,100 B2 | 7/2005 | Pavao |
| 7,073,914 B2 | 7/2006 | Pavao |
| 7,080,914 B1 | 7/2006 | Boddy |
| 7,104,663 B2 | 9/2006 | Whitehead |
| 7,722,199 B2 | 5/2010 | DeWard et al. |
| 7,914,187 B2 | 3/2011 | Higgin-Luthman et al. |
| 7,988,308 B2 * | 8/2011 | Turnbull ................. B60R 1/088 359/604 |
| 8,915,601 B2 | 12/2014 | Foote et al. |
| 9,067,541 B2 | 6/2015 | Sobecki et al. |
| 9,242,606 B2 | 1/2016 | Mambourg |
| 2007/0279588 A1 * | 12/2007 | Hammoud ............. A61B 3/113 351/206 |
| 2014/0039730 A1 * | 2/2014 | Loubiere ................. B60R 99/00 701/3 |
| 2014/0133044 A1 | 5/2014 | Mambourg |
| 2014/0336876 A1 | 11/2014 | Gieseke et al. |
| 2014/0376119 A1 | 12/2014 | Sobecki et al. |
| 2015/0009010 A1 | 1/2015 | Biemer |
| 2015/0224919 A1 | 8/2015 | Sobecki et al. |
| 2015/0232030 A1 | 8/2015 | Bingwald |
| 2015/0296135 A1 | 10/2015 | Wacquant et al. |
| 2016/0137126 A1 | 5/2016 | Fursich |

* cited by examiner

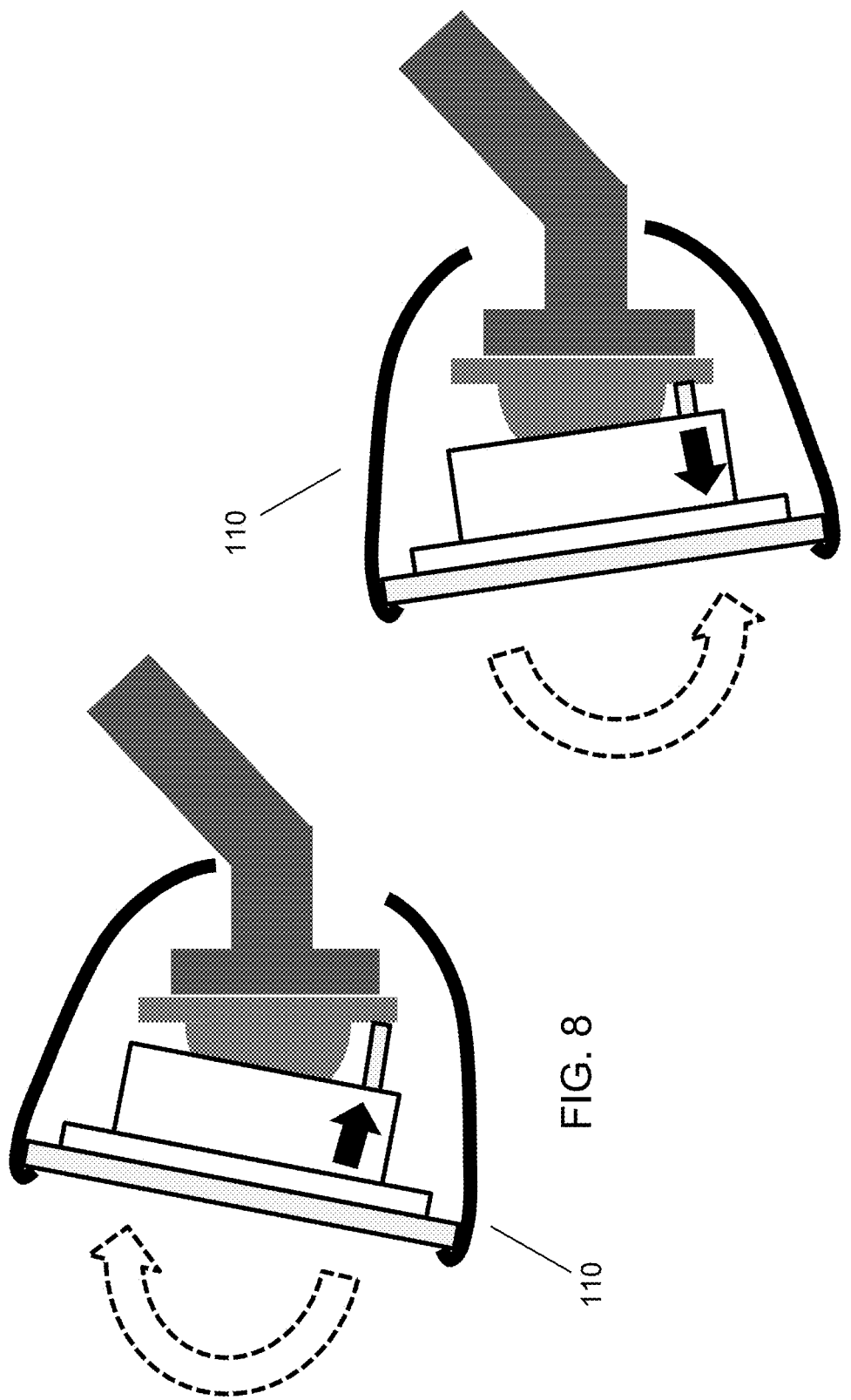

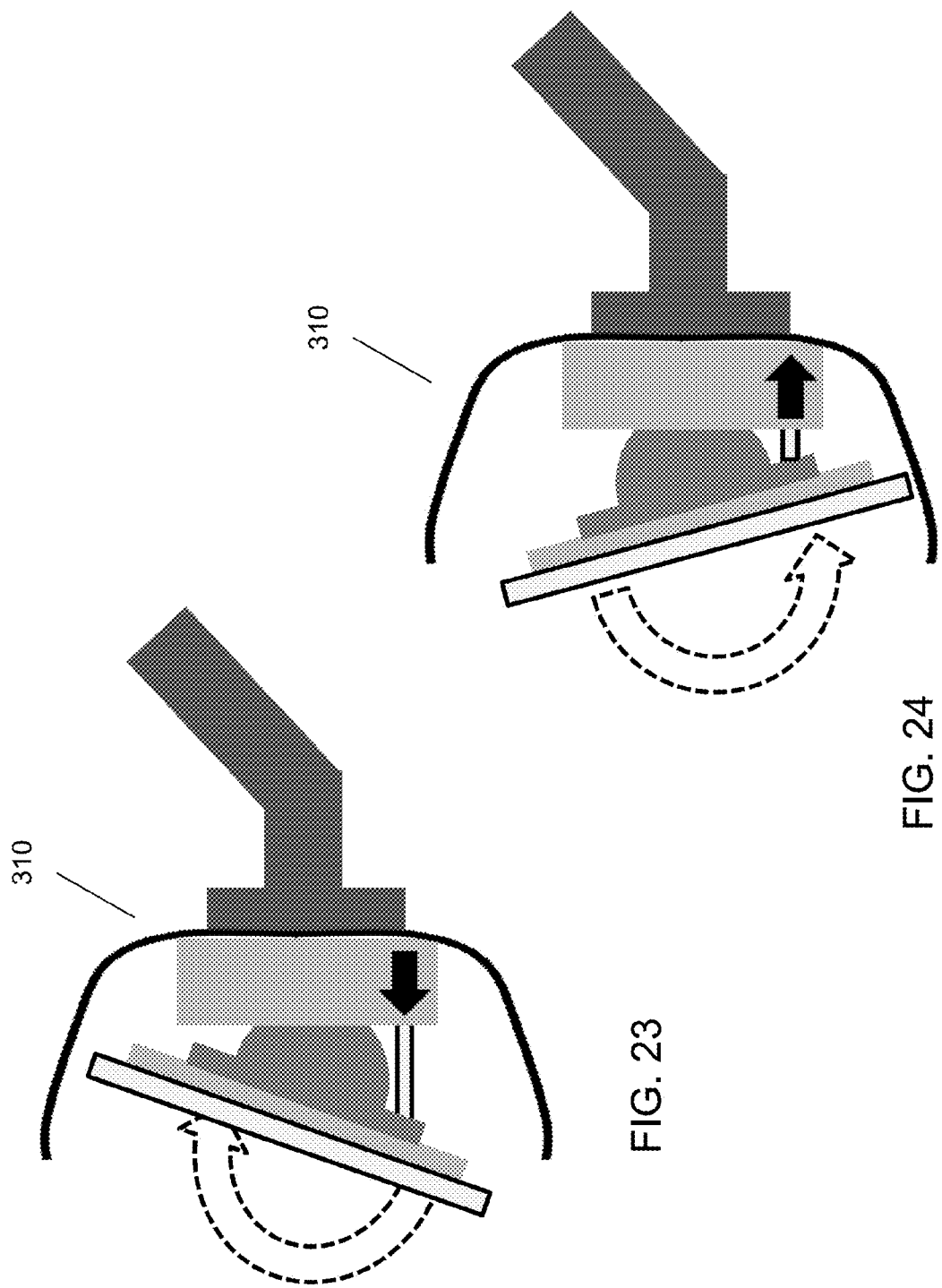

VEHICLE INTERIOR REARVIEW MIRROR ASSEMBLY WITH ACTUATOR

CROSS REFERENCE TO RELATED APPLICATION

The present application claims the filing benefits of U.S. provisional application Ser. No. 61/937,740, filed Feb. 10, 2014, which is hereby incorporated herein by reference in its entirety.

FIELD OF THE INVENTION

The present invention generally relates to an interior rearview mirror assembly and, more particularly, to an interior rearview mirror assembly with an actuator, such as for a vehicle memory mirror system.

BACKGROUND OF THE INVENTION

Conventional vehicle memory mirror systems typically include one or more exterior mirror assemblies which are equipped with electrically operated motors that provide for repositioning of the mirror assemblies' reflective elements with respect to one or more axes. Particularly for exterior sideview mirrors, it is known to incorporate memory-positioning systems so that a driver of a vehicle may select a desired position of the exterior sideview mirror by simply pushing a button. Less known, but currently available, are memory mirror systems, which include memory positions not only for the exterior sideview mirror assemblies but further, for the interior rearview mirror assembly. Incorporated into each of these mirror assemblies is a drive mechanism, which provides for the memory positions for each of the reflective elements in the mirror assemblies.

SUMMARY OF THE INVENTION

The present invention provides a vehicular mirror system having an interior rearview mirror assembly with an actuator incorporated therein for electronically adjusting the rearward field of view of the mirror reflective element of the mirror assembly when the assembly is normally mounted in the interior cabin of the vehicle. The actuator includes two motors, with each motor adjusting a mounting post that is attached at a respective region of a mounting plate or attachment plate of the mirror reflective element. The actuator comprises a reduced size actuator that provides enhanced torque and/or reduced size and weight. The motors and posts of the actuator (and the motors driving the posts) are adjusted or operated in tandem to pivot or adjust the mirror reflective element (such as responsive to a user input) to provide the desired rearward field of view to the driver of the vehicle. Thus, both motors operate together for any given adjustment of the reflective element.

The actuator includes a first part that is fixedly attached at a mounting structure of the mirror assembly and fixed relative an interior structure of the vehicle and a second part that is attached at the reflective element, such as at a back plate of the reflective element. The actuator pivots the second part relative to the first part to adjust the reflective element, such as to vertically adjust or flip the mirror reflective element between a daytime position and a nighttime reduced glare position. The mirror casing may attach to or otherwise be fixed relative to the reflective element and back plate, such that the mirror casing pivots relative to the first part of the actuator and the mounting structure so that the mirror head adjusts between the daytime and nighttime positions. The first part or the second part includes the actuator motors while the other part may comprise the adjustment plate.

Therefore, the present invention provides an actuator for an interior rearview mirror assembly that is operable to adjust the mirror head (including the mirror casing and the mirror reflective element) relative to a mounting structure of the mirror assembly. The actuator thus may vertically adjust the mirror head to pivot the mirror reflective element between a daytime position, where the mirror reflective element is oriented relative to the driver of the vehicle to provide a field of view rearward of the vehicle with a reflectance surface being a front surface of the mirror reflective element, and a nighttime position, where the mirror reflective element is oriented relative to the driver to provide a field of view rearward of the vehicle with the reflectance surface being a rear surface of the mirror reflective element.

Optionally, the first part may pivotally mount at the mounting structure, such as at a ball and socket joint of a single or double ball mirror mounting arrangement. Thus, a driver of the vehicle may manually adjust the mirror head (and reflective element) about the vertical and horizontal axes to set a desired rearward field of view, and then may adjust the field of view upwards or downward (such as in a similar manner as done by a mirror toggle of a known prismatic mirror assembly).

These and other objects, advantages, purposes and features of the present invention will become apparent upon review of the following specification in conjunction with the drawings.

BRIEF DESCRIPTION OF THE DRAWINGS

FIG. 8 is a side elevation and partial sectional view of the mirror assembly of FIG. 7, shown with the mirror reflective element angled upwards;

FIG. 9 is a side elevation and partial sectional view of the mirror assembly of FIG. 7, shown with the mirror reflective element angled downwards;

FIG. 23 is a side elevation and partial sectional view of the mirror assembly of FIG. 22, shown with the mirror reflective element angled upwards;

FIG. 24 is a side elevation and partial sectional view of the mirror assembly of FIG. 22, shown with the mirror reflective element angled downwards;

DESCRIPTION OF THE PREFERRED EMBODIMENTS

Figure 1:
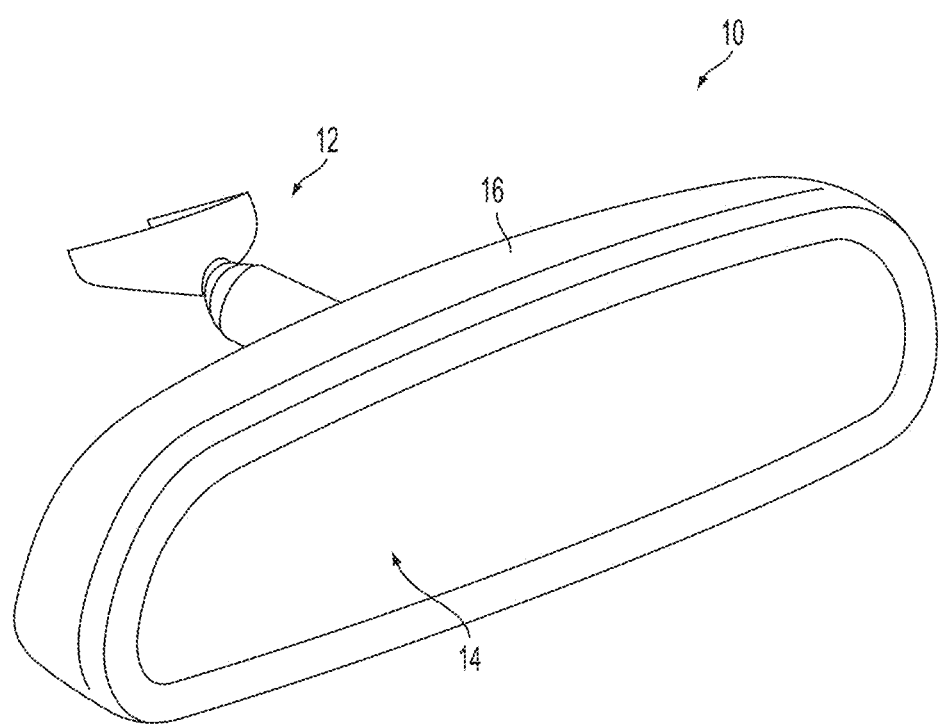
FIG. 1 is a perspective view of an interior rearview mirror assembly incorporating a mirror actuator in accordance with the present invention.

Referring now to the drawings and the illustrative embodiments depicted therein, an interior rearview mirror assembly 10 for a vehicle includes a mounting structure 12 and a reflective element 14 adjustably positioned at and partially in a mirror casing 16 (FIG. 1). The mirror mounting structure 12 may fixedly or non-movably or movably mount or attach the mirror assembly 10 at a fixed structure of the vehicle, such as at an interior surface of a vehicle windshield or the like. Reflective element 14 is adjustably positioned at or partially in mirror casing 16 and is adjustable via an actuator 18 (FIGS. 4-6), which is attached at the rear of the reflective element 14 (such as at a backplate or attachment plate 20 of the actuator or of the reflective element) and at the mirror casing or the mounting structure or plate 22 (which may be at the rear of the mirror casing or part of the mirror casing, or may be a mounting structure that is fixedly mounted at the interior portion of the vehicle), so that actuation of actuator 18 causes adjustment of mirror reflective element 14 relative to the mirror casing and mounting structure (which may also be fixedly or non-movably mounted at the mounting structure and/or windshield) so as to adjust a rearward field of view of the driver of the vehicle, as discussed below.

The mirror assembly and/or mirror actuator may utilize aspects of the mirror systems described in U.S. Pat. Nos. 6,698,905; 7,104,663 and/or 7,722,199, which are hereby incorporated herein by reference in their entireties. Although shown and described as being mounted to the vehicle windshield, it is envisioned that, optionally, the mirror assembly may be located or attached elsewhere at the vehicle, such as at an overhead console or headliner of the vehicle or the like. Also, although shown and described as an actuator for interior rearview mirror assembly, aspects of the actuator of the present invention may be suitable for use in exterior rearview mirror assemblies of vehicles, while remaining within the spirit and scope of the present invention.

Figure 3:
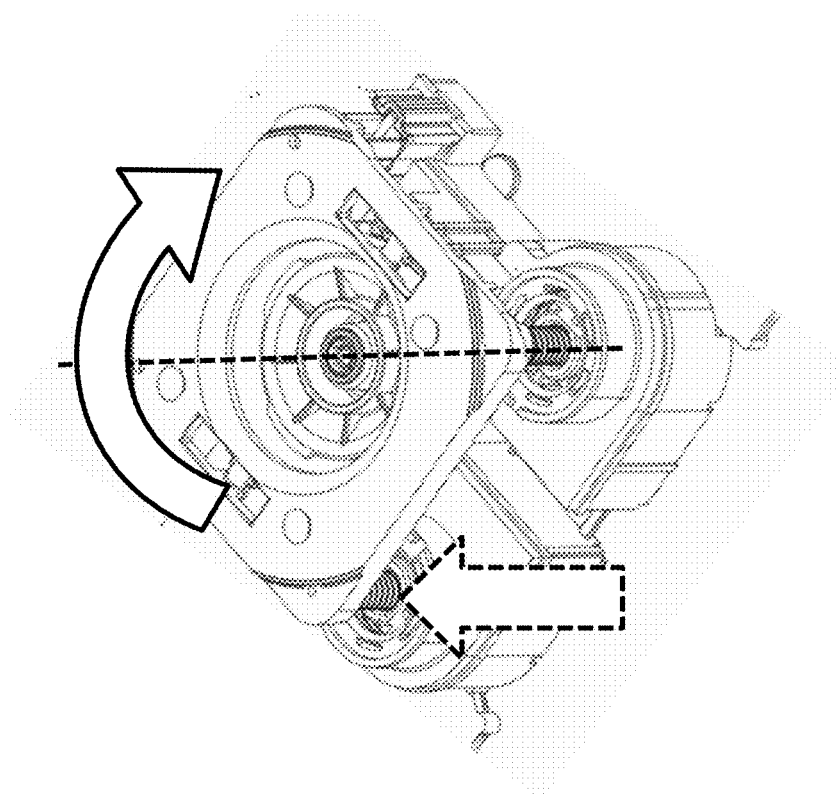
FIGS. 2 and 3 are perspective views of a mirror actuator, showing known operation or adjustment of a mirror actuator.
Figure 2:
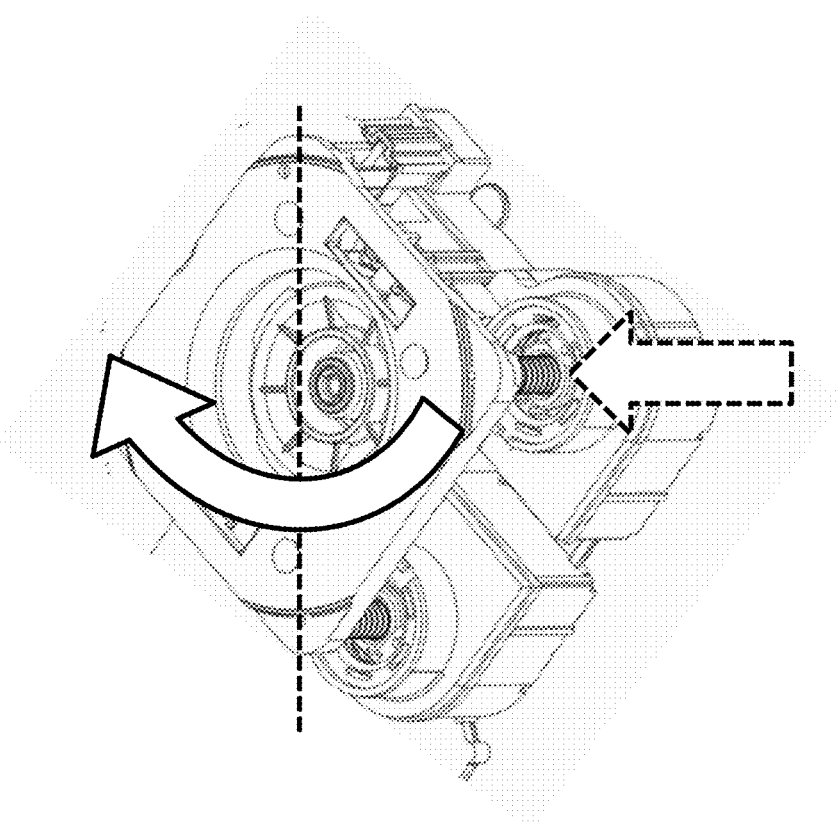

As shown in FIGS. 2 and 3, a mirror actuator typically operates to individually extend or retract one of the posts. Such mirror actuators typically have two drive elements that each independently move to adjust the reflective element position. For example, one motor and gear train of the actuator will control up/down adjustment (FIG. 2), and the other motor and gear train of the actuator will control left/right adjustment (FIG. 3). The two motors and drive elements do not operate at the same time.

Figure 4:
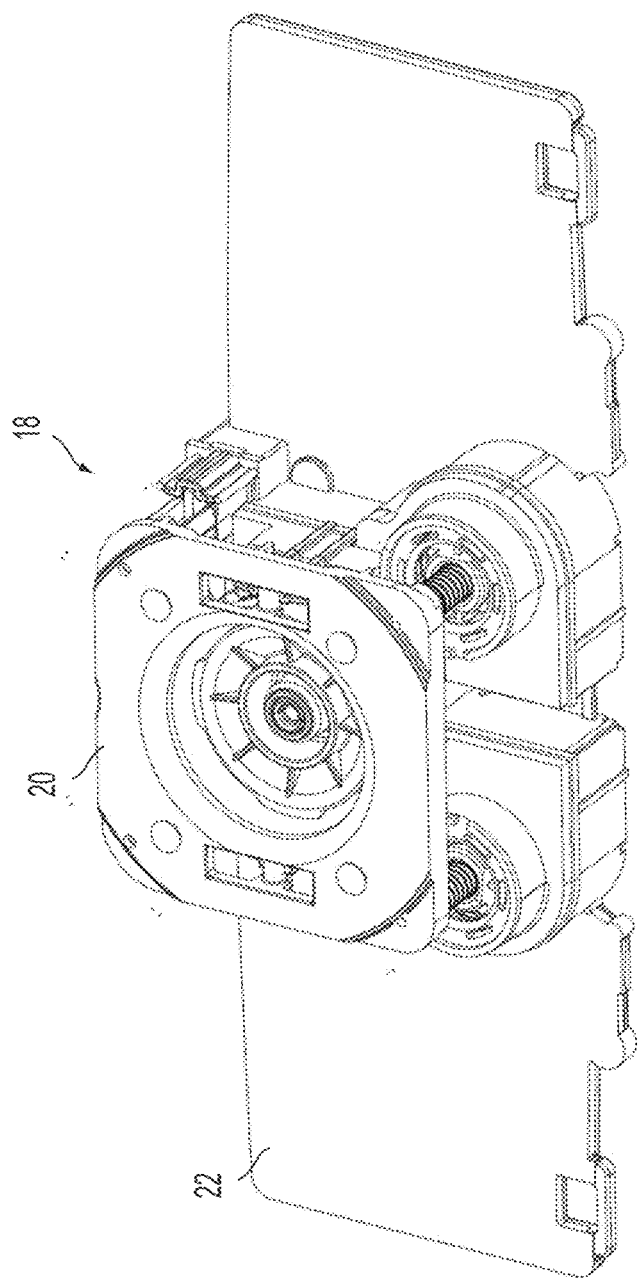
FIG. 4 is a perspective view of an actuator of an interior rearview mirror assembly in accordance with the present invention.
Figure 5:
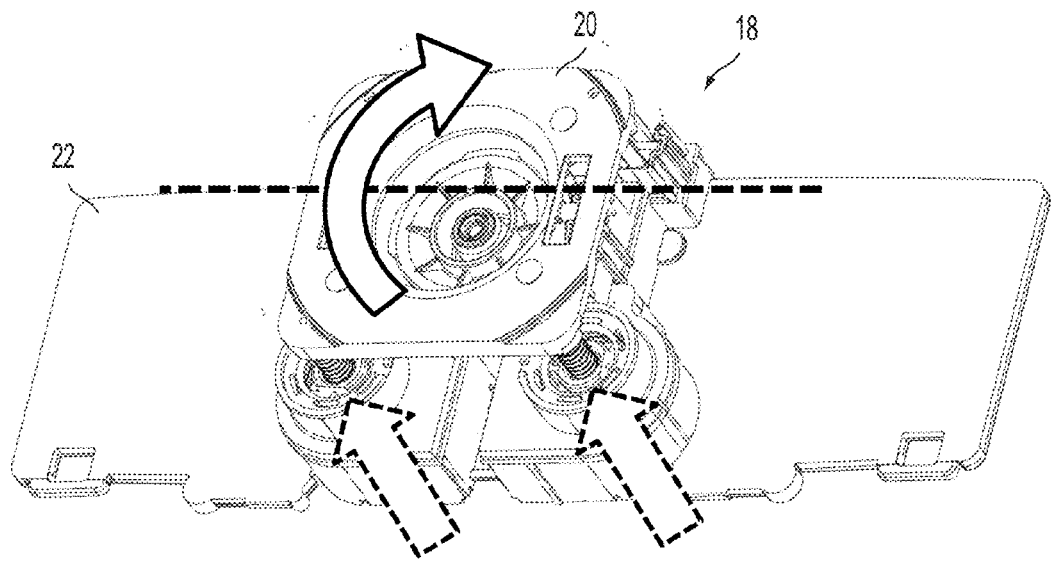
FIGS. 5 and 6 are perspective views of the mirror actuator of the present invention, showing operation of the mirror actuator.
Figure 6:
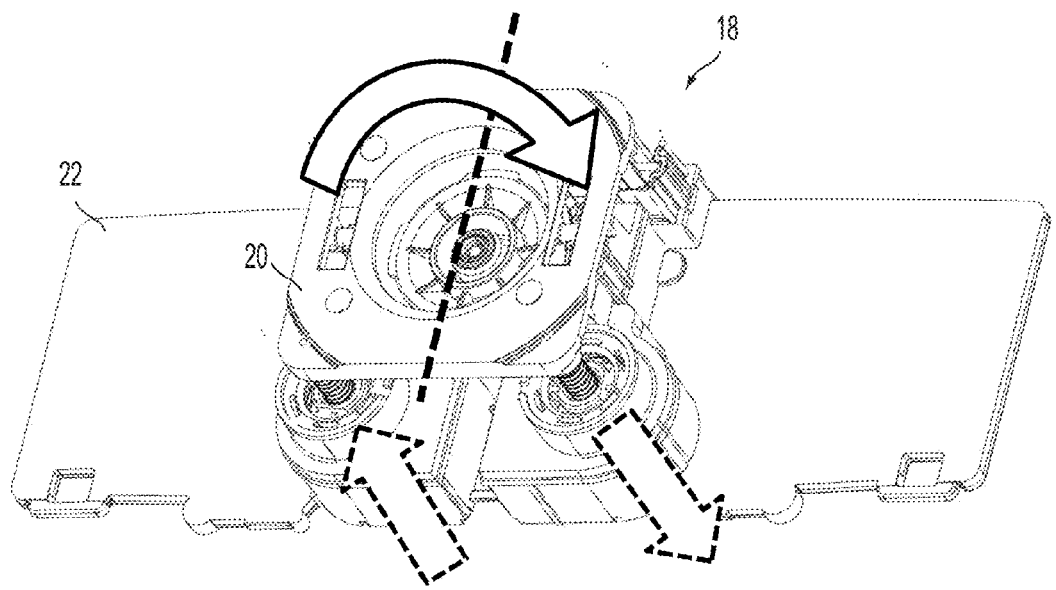
Figure 7:
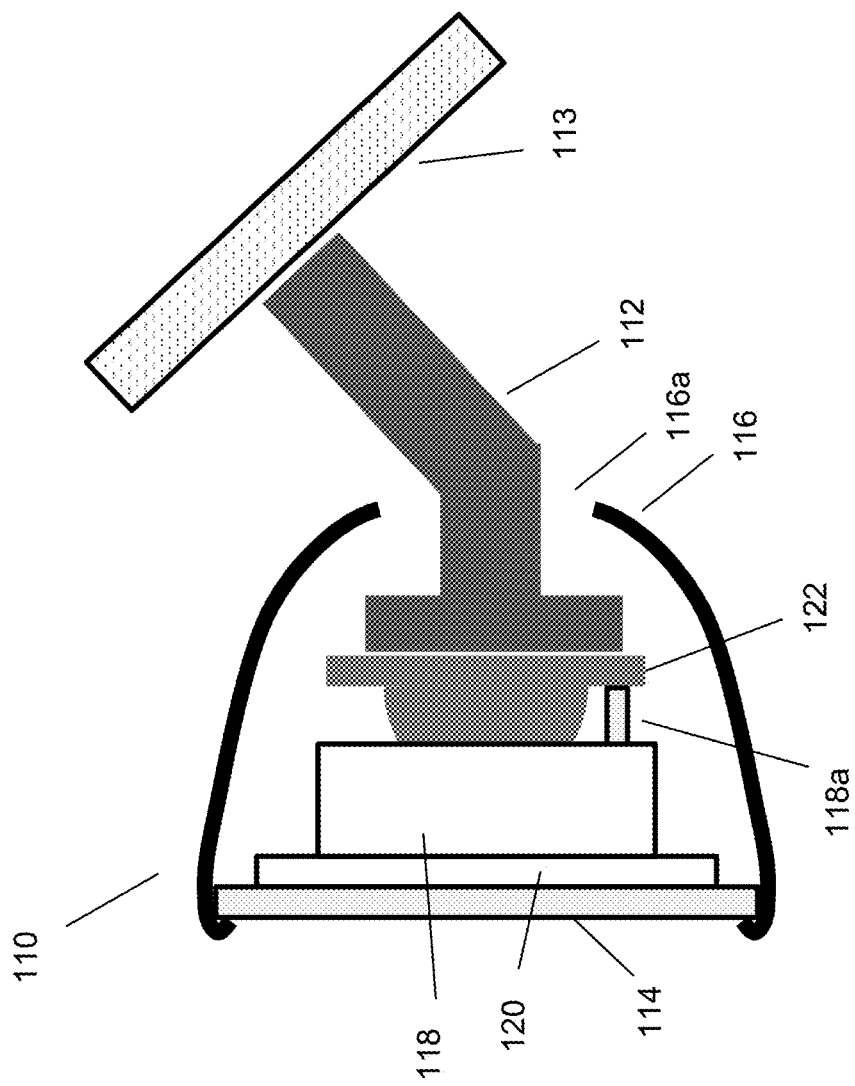
FIG. 7 is a side elevation and partial sectional view of a mirror assembly of the present invention.
Figure 10:
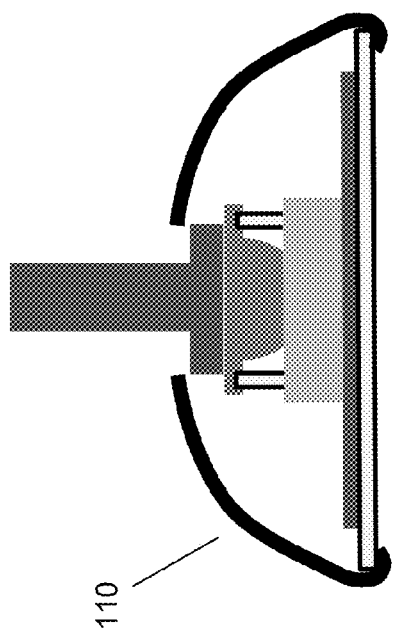
FIG. 10 is a top view and partial sectional view of the mirror assembly of FIG. 7.

As shown in FIGS. 4-6, the mirror actuator 18 of the present invention is operable to drive both motors and mounting posts in tandem or at the same time for each adjustment. In the illustrated embodiment, the motors and posts are arranged along a lower portion of the reflective element with the reflective element being pivotable about a generally centrally located pivot joint of the actuator (that pivotally mounts the attaching plate 20 at the actuator housing). Although shown as having the motors and drive elements or posts along the lower region of the actuator and attaching plate, the motors may be generally vertically aligned along one of the sides of the attaching plate or may be otherwise positioned and oriented about the pivot joint of the actuator, while remaining within the spirit and scope of the present invention.

Thus, in order to adjust the reflective element about one axis (such as, for example, up/down adjustment (FIG. 5) that adjusts the reflective element about a generally horizontal pivot axis), both motors operate and both posts or drive elements move together in the same direction. In order to adjust the reflective element about the other axis (such as, for example, left/right adjustment (FIG. 6) that adjusts the reflective element about a generally vertical pivot axis) the two motors operate in opposite directions and the posts or drive elements move in opposite direction. For example, one post pushes the reflective element or attachment plate outwardly and the other pulls the reflective element or attachment plate inwardly. Using both drive elements for each adjustment results in higher torque for each adjustment, which allows for a higher-friction electric clutch, providing increased mirror stability. Also, such a configuration may allow for use of smaller motors to reduce the weight and power consumption of the mirror actuator.

The actuator includes an actuator housing (which may be fixedly secured to the mounting structure), and two motors and posts or attachment elements or positioning elements, which extend from the actuator housing and pivotally attach to the rear of the reflective element (such as to the rear of a backing plate or the like at the rear surface of the reflective element), and which may be longitudinally adjustable to extend/retract to adjust the position of or to pivot the reflective element. Optionally, the actuator housing (with the motors and gears) may attach at the rear of the reflective element and the adjustment plate may attach at the mounting structure, while remaining within the spirit and scope of the present invention. The housing houses the motors and associated gearing (not shown) for driving and/or extending and/or retracting the posts or positioning element or elements relative to the housing, such as is known in the art of exterior mirror actuators.

The actuator thus may actuate to move the actuating or positioning elements, which act generally perpendicularly to the rear of the reflective element and perpendicular to the glass element itself, such as is described in U.S. Pat. No. 5,900,999, which is hereby incorporated herein by reference in its entirety. The actuator may utilize aspects of exterior mirror actuators of the types described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and/or 5,900,999, which are hereby incorporated herein by reference herein in their entireties, or may comprise any other suitable actuator designs.

The actuator may be housed in the mirror casing and operable to adjust the mirror reflective element relative to the mirror casing. Optionally, such as shown in FIG. 1, the mirror casing may be adjustably mounted at an interior portion of the vehicle (such as at the vehicle windshield or the like), whereby the mirror casing may be grossly adjusted relative to the interior portion of the vehicle via manual adjustment (such as to position the mirror casing and reflective element at a nominal or initial or close setting for the driver of the vehicle), and then the reflective element may be finely adjusted via operation of the actuator to provide the desired rearward field of view to the driver of the vehicle. Optionally, the mirror assembly may be attached at or may include a mounting structure that is mounted to or secured at or fixedly attached proximate to a fixed, substantial structure of the vehicle, such as at an interior surface of the vehicle windshield. The actuator may be positioned at and within a fixed casing or housing that may house or contain or encase other accessories or components or circuitry, and may fixedly hold such other circuitry or accessories in a fixed position relative to the vehicle. Optionally, the actuator and other structure may be mounted to an attachment structure or frame that is itself adhesively or mechanically attached to the interior windshield surface, or the interior rearview mirror assembly may be provided as a unitary standalone assembly, including a housing, that mechanically attaches (or optionally adhesively attaches) to the windshield. The mounting structure may be fixedly or non-movably attached or coupled to the vehicle structure, and may be detachably attached thereto, such as via a mechanical attachment element or structure.

Optionally, and with reference to FIGS. 7-12, an interior rearview mirror assembly 110 for a vehicle includes a mounting structure 112 and a reflective element 114 attached at an attachment plate 120 that is attached at the actuator 118. The mirror mounting structure 112 may fixedly or non-movably or movably mount or attach the mirror assembly at a fixed structure of the vehicle, such as at an interior surface of a vehicle windshield 113 or the like. Reflective element 114 is positioned at or partially in mirror housing or casing 116 and is adjustable via the actuator 118, which is attached at the rear of the reflective element 114 (such as at a backplate or attachment plate 120 of the actuator or of the reflective element) and at the mounting structure 112 or at an adjustment plate 122 (which may be at the mounting structure that is fixedly mounted at the interior portion of the vehicle), so that actuation of actuator 118 causes adjustment of mirror reflective element 114 (in tandem with the mirror casing 116) relative to the mounting structure (which may also be fixedly or non-movably mounted at the mounting structure and/or windshield) so as to adjust a rearward field of view of the driver of the vehicle.

Figure 12:
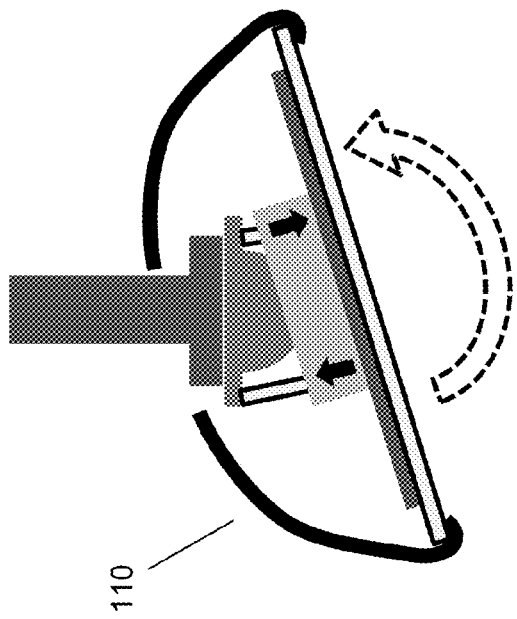
FIG. 12 is a top view and partial sectional view of the mirror assembly of FIG. 10, shown with the mirror reflective element angled towards the right.
Figure 11:
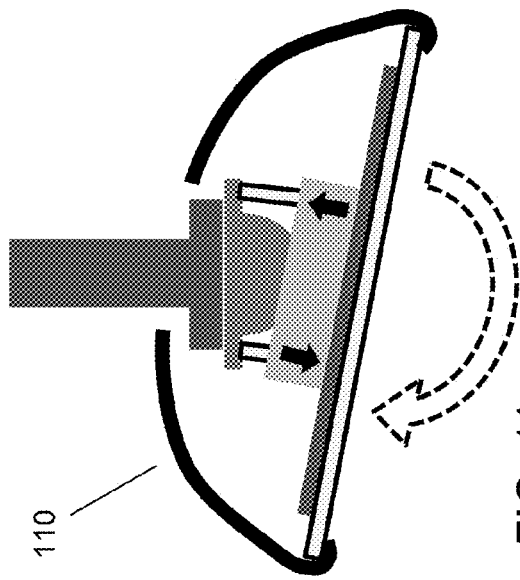
FIG. 11 is a top view and partial sectional view of the mirror assembly of FIG. 10, shown with the mirror reflective element angled towards the left.

In the illustrated embodiment, the actuator 118 is operable to adjust the mirror reflective element 114 in tandem with the mirror casing 116 and relative to the mounting structure 112, such as via extension/retraction of the drive elements 118a of the actuator 118. The mirror casing 116 includes an aperture or opening 116a at its rear portion to allow for movement of the mirror casing relative to the mounting structure 112. Thus, the actuator 118 may adjust the reflective element relative to the mounting structure and the vehicle to provide the desired field of view to the driver of the vehicle (such as side to side adjustment as can be seen in FIGS. 11 and 12 and up and down adjustment as can be seen in FIGS. 8 and 9). Optionally, the mirror reflective element may be manually adjusted to a nominal position or desired position by the driver to provide a desired field of view rearward of the vehicle. For example, the mirror reflective element may be adjusted via manual adjustment of the mirror head about a single or double ball mounting structure or such as via manual adjustment of the actuator via a clutch mechanism of the actuator, such as by utilizing aspects of the actuators described in U.S. Publication No. US-2014-0133044, which is hereby incorporated herein by reference in its entirety. After the mirror reflective element is manually adjusted, if further mirror adjustments are desired, the actuator may be operated to finely adjust the reflective element to enhance or optimize the driver's rearward field of view (such as in response to a user input or toggle or joystick control or the like).

For applications with a prismatic reflective element or other reflective element of similar construction and/or functionality, the mirror assembly of the present invention may include a user actuatable input or button or switch or toggle or the like for selectively operating the actuator for switching or "flipping" the mirror between the day setting and the night or anti-glare setting. For example, a button or toggle or other input (such as touch sensor or proximity sensor or the like) may be located at the mirror casing (and may be located at a lower region of the bezel portion so as to be generally at the location of a typical toggle or flip mechanism of a conventional prismatic mirror assembly) and the driver may selectively actuate the input to change the mirror setting. When the input is actuated, the mirror actuator automatically rotates or pivots the prismatic reflective element about a generally horizontal pivot axis to pivot or flip the reflective element between the day position and the night or anti-glare position. For example, the actuator may flip or adjust the reflective element and housing upward (FIG. 8) or downward (FIG. 9), such as in a similar manner as achieved by known manual toggle assemblies of prismatic mirrors. Optionally, the mirror actuator may automatically pivot or adjust the prismatic reflective element responsive to a glare light sensor of the mirror assembly, such that the mirror actuator provides an auto-dimming function to a prismatic reflective element.

Figure 13:
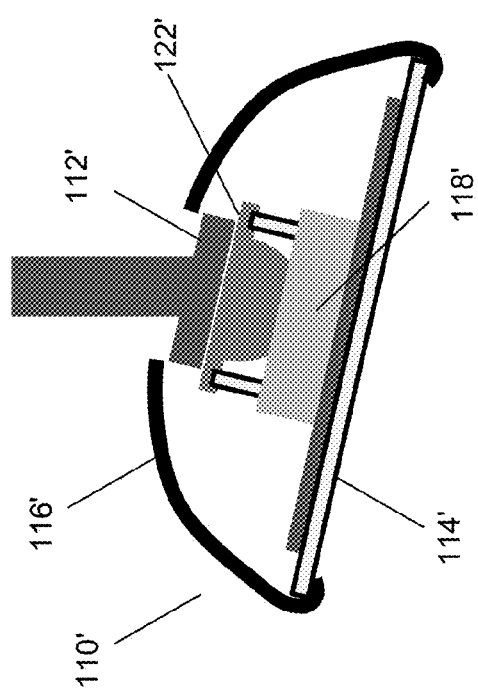
FIG. 13 is a top view and partial sectional view of another mirror assembly similar to the mirror assembly of FIG. 7, with the mounting structure angled to mount the mirror head at an angle towards the driver of the vehicle.
Figure 15:
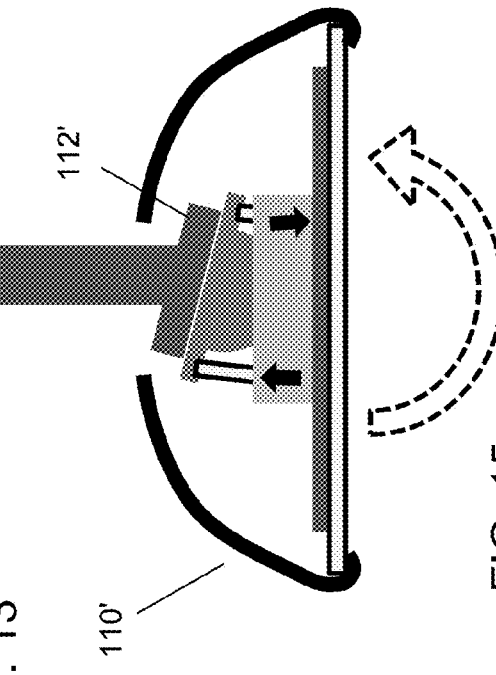
FIG. 15 is a top view and partial sectional view of the mirror assembly of FIG. 13, shown with the mirror reflective element angled towards the right or center.
Figure 14:
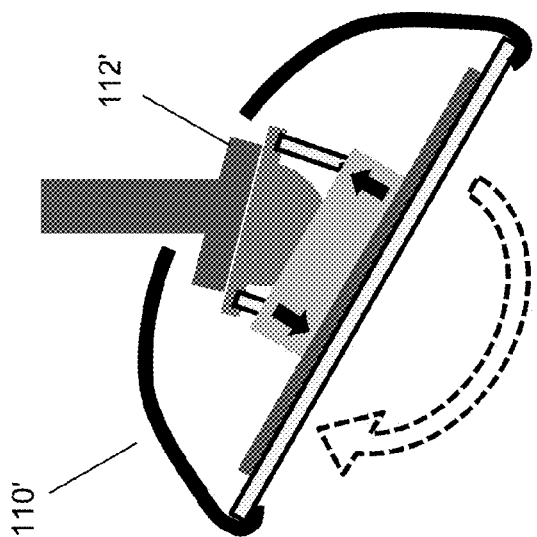
FIG. 14 is a top view and partial sectional view of the mirror assembly of FIG. 13, shown with the mirror reflective element angled further towards the left.
Figure 16:
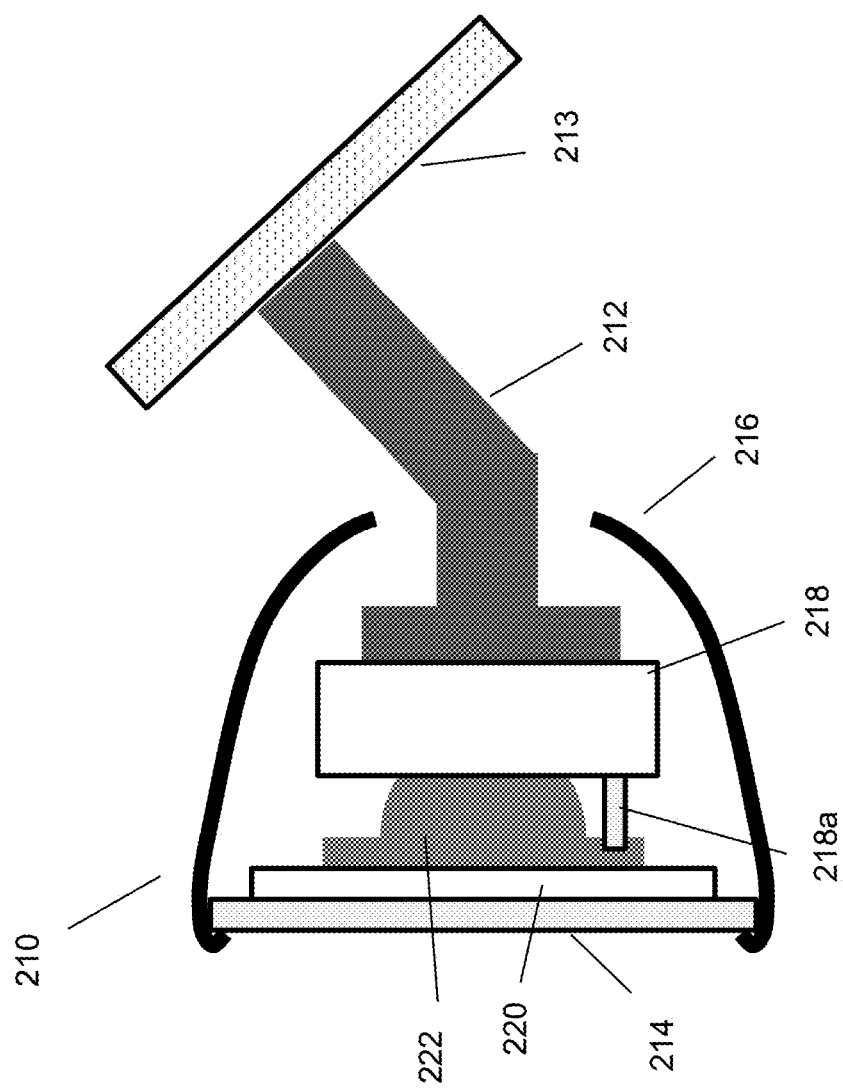
FIG. 16 is a side elevation and partial sectional view of another mirror assembly of the present invention.
Figure 17:
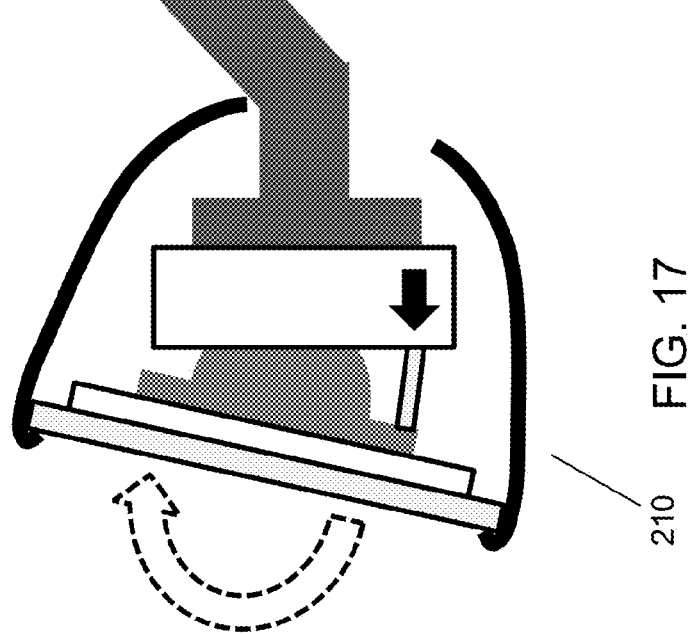
FIG. 17 is a side elevation and partial sectional view of the mirror assembly of FIG. 16, shown with the mirror reflective element angled upwards.
Figure 18:
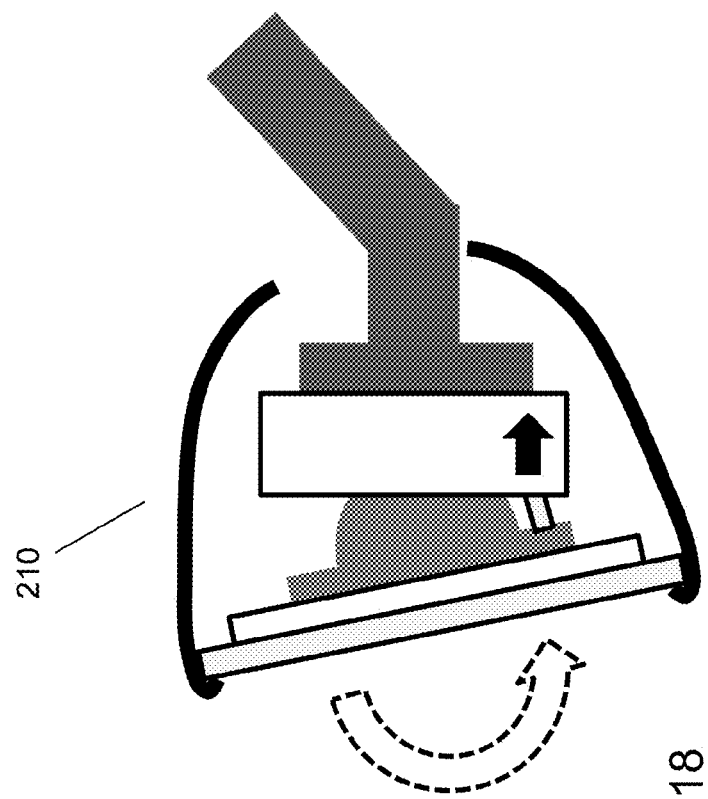
FIG. 18 is a side elevation and partial sectional view of the mirror assembly of FIG. 16, shown with the mirror reflective element angled downwards.
Figure 19:
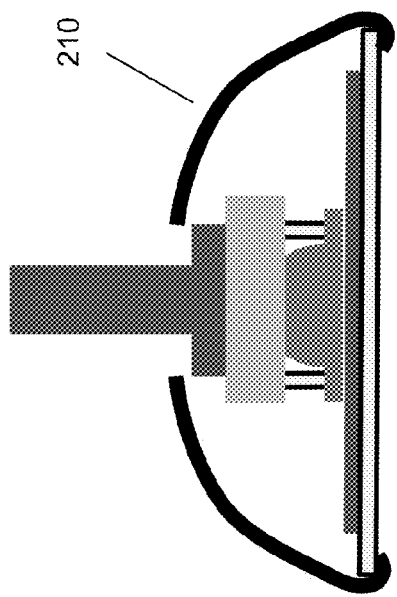
FIG. 19 is a top view and partial sectional view of the mirror assembly of FIG. 16.
Figure 21:
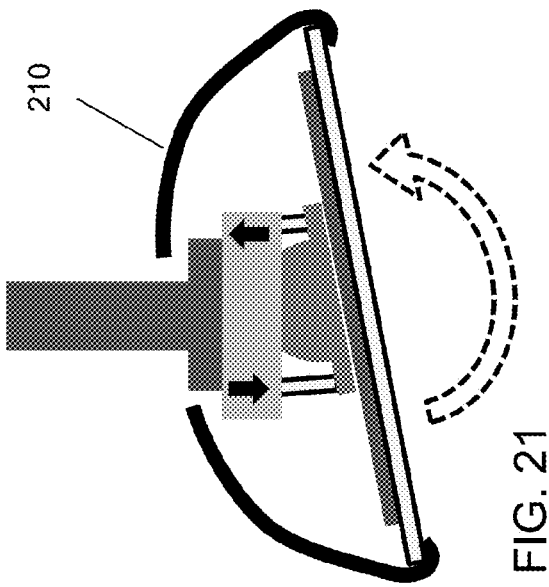
FIG. 21 is a top view and partial sectional view of the mirror assembly of FIG. 19, shown with the mirror reflective element angled towards the right.
Figure 20:
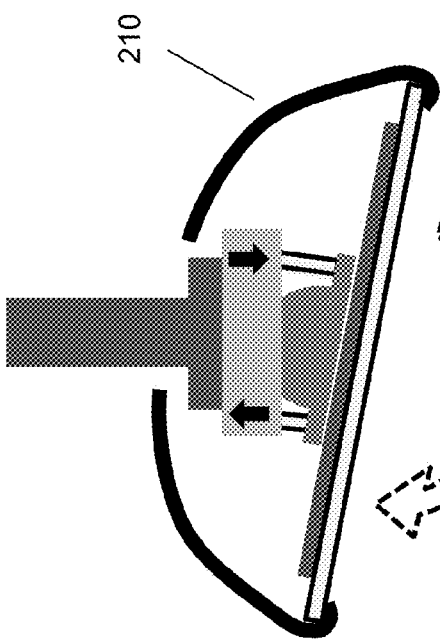
FIG. 20 is a top view and partial sectional view of the mirror assembly of FIG. 19, shown with the mirror reflective element angled towards the left.
Figure 22:
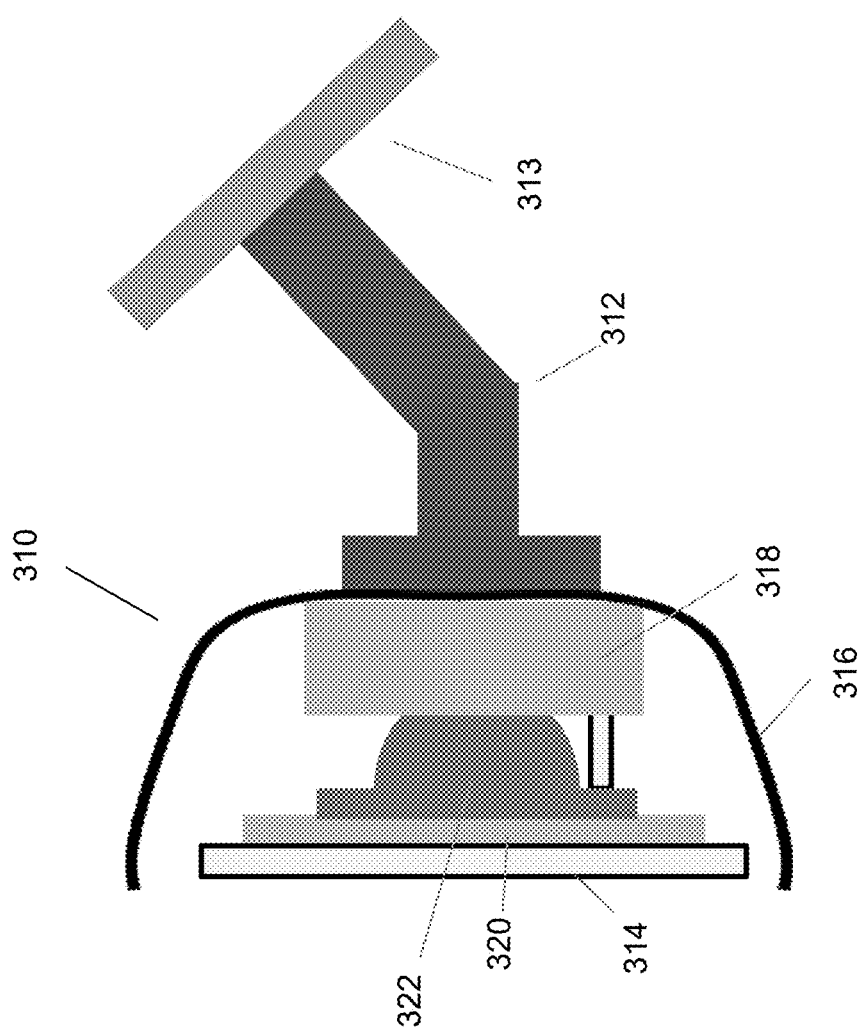
FIG. 22 is a side elevation and partial sectional view of another mirror assembly of the present invention.
Figure 25:
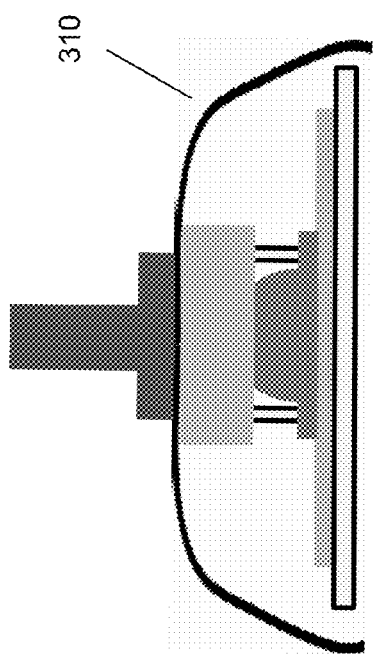
FIG. 25 is a top view and partial sectional view of the mirror assembly of FIG. 22.
Figure 27:
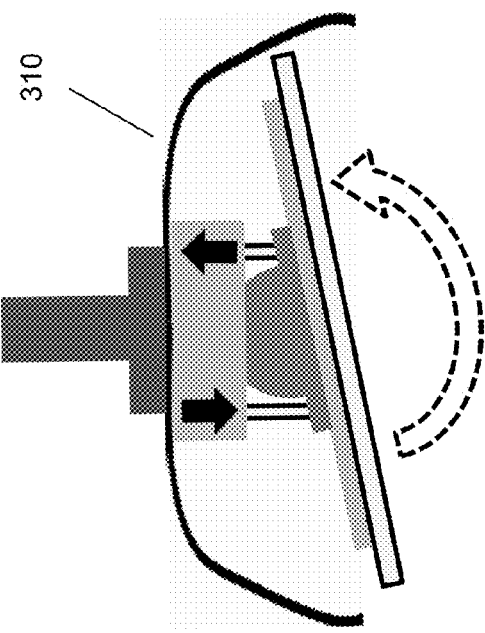
FIG. 27 is a top view and partial sectional view of the mirror assembly of FIG. 25, shown with the mirror reflective element angled towards the right.
Figure 26:
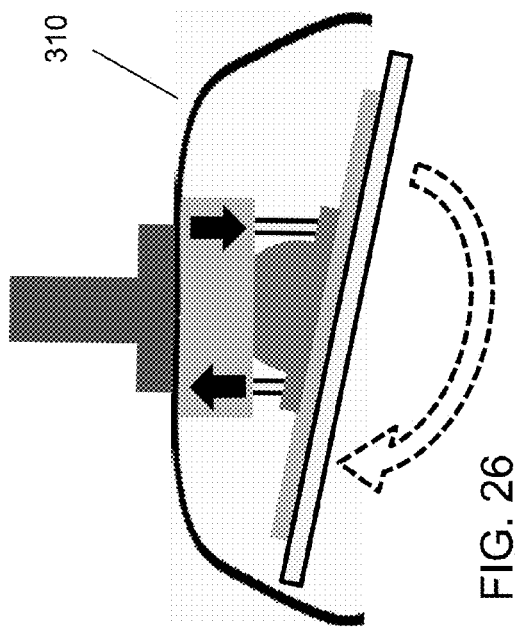
FIG. 26 is a top view and partial sectional view of the mirror assembly of FIG. 25, shown with the mirror reflective element angled towards the left.

Optionally, the mounting structure may be angled or canted towards the driver of the vehicle, such that, with the actuator in its central or non-angled position or orientation, the mirror head and reflective element are angled towards the driver of the vehicle. For example, and such as shown in FIGS. 13-15, the mounting structure 112' of the mirror assembly 110' is angled, such that the adjustment plate 122' and actuator 118' (and thus the reflective element 114' and mirror casing or housing 116') are angled towards the driver side of the vehicle when the mirror assembly is mounted in the vehicle. In the illustrated embodiment, the centered or non-angled position of the actuator results in the reflective element angled towards the driver side of the vehicle (FIG. 13), and when the actuator is actuated to pivot or adjust the reflective element towards the driver side, the reflective element is further angled or canted (FIG. 14), and when the actuator is actuated to pivot or adjust the reflective element towards the passenger side, the reflective element may move to a generally non-angled position (FIG. 15). Clearly, other degrees of angling or canting by the mounting structure and/or the actuator may be implemented while remaining within the spirit and scope of the present invention.

As shown in FIGS. 7-12, the actuator 118 may be attached at the attachment plate 120 at the rear of the reflective element 114, with the adjustment plate 122 attached at the mounting structure 112, and with the drive element 118a linked between the fixed adjustment plate and the actuator. During operation of the actuator, the mounting structure and adjustment plate are fixed, while the actuator, attachment plate, mirror reflective element and mirror housing move (such as can be seen with reference to FIGS. 8-12).

Optionally, and desirably, and such as shown in FIGS. 16-21, the actuator 218 may be attached at the mounting structure 212, with the adjustment plate 222 attached at the attachment plate 220 at the rear of the reflective element 214, and with the drive element 218a linked between the fixed actuator and the adjustable adjustment plate 222. During operation of the actuator (such as can be seen with reference to FIGS. 17, 18, 20 and 21), the mounting structure 212 and actuator 218 are fixed (such as relative to the vehicle windshield 213), while the adjustment plate 222, the attachment plate 220, the mirror reflective element 214 and mirror housing 216 move. Such a configuration may be preferred because it has the heavier actuator (with the motors and gears) mounted directly at the mounting structure, which results in increased stability of the mirror reflective element. The mirror assembly 210 of FIGS. 16-21 may otherwise be substantially similar to the mirror assemblies 110, 110', discussed above, such that a detailed discussion of the mirror assemblies need not be repeated herein.

Optionally, and such as shown in FIGS. 22-27, an interior rearview mirror assembly 310 for a vehicle includes a mounting structure 312 and a reflective element 314 attached at an attachment plate 320 that is attached at the adjustment plate 322, which is pivotably or adjustably connected to the actuator 318. The mirror mounting structure 312 may fixedly or non-movably or movably mount or attach the mirror assembly at a fixed structure of the vehicle, such as at an interior surface of a vehicle windshield 313 or the like. Reflective element 314 is positioned at or partially in mirror housing or casing 316, and is adjustable via the actuator 318, which is attached at or fixed relative to the mounting structure 312. The actuator is attached at or fixed relative to the mirror housing or casing 316, such that the reflective element adjusts relative to the mirror casing 316 and the mounting structure 312. Thus, actuation of actuator 318 causes adjustment of mirror reflective element 314 relative to the mirror casing 116 and relative to the mounting structure (which may also be fixedly or non-movably mounted at the mounting structure and/or windshield) to adjust a rearward field of view of the driver of the vehicle. The actuator or the mirror casing may be manually adjustable relative to the mounting structure (or the mounting structure may include a ball joint or the like) such that the driver may manually adjust the mirror head (including the mirror casing and the reflective element) to adjust the rearward field of view. The mirror assembly 310 of FIGS. 22-27 may otherwise be substantially similar to the mirror assemblies 110, 110', 219 discussed above, such that a detailed discussion of the mirror assemblies need not be repeated herein.

The mirror system may include a control that controls the interior mirror actuator and the exterior mirror actuators in response to a memory setting and/or a user input or inputs. Optionally, the control may, upon the first ignition of the vehicle, such as at an automobile manufacturing or assembly plant or facility (or upon a resetting of the vehicle's settings, such as when there is electrical failure or exhaustion of the battery of the vehicle), control the actuator to move or adjust the mirror reflective element to a home position or nominal position (such as the nominal position described above). A driver or user of the vehicle may set one or more memory positions for the reflective element to provide the particular driver with the preferred or appropriate rearward field of view. The control and actuator may selectively move or adjust the reflective element to an appropriate memory position in response to other subsequent ignitions of the vehicle or in response to a vehicle door unlock being triggered, such as via a remote keyless entry (RKE) fob or the like, or in response to other suitable triggering or activating events that are indicative of a particular driver approaching or entering or driving the vehicle. Additionally, user actuatable controls or inputs may be provided at the mirror assembly or elsewhere in the vehicle to allow the user or driver to adjust the orientation of the reflective element at any time as desired.

Optionally, the actuator control may be responsive to a driver monitoring system or driver gaze detection system or the like, whereby the actuator control may adjust the reflective element orientation responsive to a determined location of the driver's eyes. For example, the driver monitoring system may determine the location of the driver when the vehicle is started (such as via a seat location determination or a driver head or eye monitoring or tracking determination) and may initially adjust the reflective element to provide an appropriate rearward field of view for a driver at that determined location. The actuator control may adjust the reflective element vertically responsive to a determined height of the driver's head or eyes and/or may adjust the reflective element side-to-side responsive to the determined forward/rearward location of the driver relative to the mirror assembly (such as responsive to a seat adjustment system or the like).

Optionally, the actuator control may be responsive to a driver eye tracking system to continuously or episodically adjust and maintain a desired or appropriate or ideal rearward field of view of the driver as the driver's position/posture may change. For example, if the driver moves the driver seat forward or rearward (or up or down), the actuator control may adjust the reflective element to generally maintain the selected rearward field of view for the driver's new head and eye location. Also, the actuator control may activate upon actuation of the vehicle ignition to scan and identify and determine the driver position and/or posture and to set up a best guess adjustment position for an appropriate rearward field of view. Such a system may function like a memory mirror system, but without needing to initially manually set and store the desired or selected position, and it would then be adaptable to any number of drivers. If the individual driver's preferences are different than the determined position of the reflective element, the driver can make minor adjustments of the mirror reflective element via a user input (such as a joystick or the like) that controls the actuator control. The actuator control thus may be responsive to a driver head or eye tracking or monitoring system (such as a system utilizing aspects of camera-based systems and/or the systems described in U.S. Pat. No. 7,914,187 and/or U.S. Publication Nos. US-2015-0009010 and/or US-2014-0336876 and/or International Publication No. WO 2014/204794 and/or U.S. provisional applications, Ser. No. 62/100,648, filed Jan. 7, 2015, and/or Ser. No. 62/035,615, filed Aug. 11, 2014, which are hereby incorporated herein by reference in their entireties) and/or seat adjustment system and/or ignition system and/or the like, in order to provide continuous or episodic adjustment of the mirror reflective element both at the initial startup of the vehicle and during a driving situation where the driver may adjust his or her position for comfort or due to a particular driving condition.

When positioned or mounted in or at the vehicle (such as at the interior surface of the vehicle windshield or the like), the actuator is mounted at and supported by the mirror mounting structure so as to support the reflective element at a nominal orientation when the actuator is centered or at its nominal or centered setting. Thus, the reflective element (which is adjustably supported by actuator) may be initially or selectively located or oriented at a nominal position or orientation that is angled for proper rearward viewing by a typical vehicle driver. For example, the actuator may be mounted (via the mounting structure) to support the reflective element at a nominal orientation that is canted or angled at about 20 degrees to about 24 degrees toward the driver side of the vehicle (relative to a longitudinal axis of the vehicle that extends along the vehicle and in a forward/rearward direction along the vehicle), and preferably about 22 degrees toward the driver side of the vehicle, and about 2 degrees to about 6 degrees downward (relative to a generally horizontal axis of the vehicle that is generally transverse to the direction of travel of the vehicle), and preferably about 4 degrees downward, when the mirror casing is mounted at the vehicle. The actuator may adjust the reflective element relative to the mounting structure and relative to the mirror casing and the vehicle and about horizontal and vertical pivot axes to adjust the field of view for the particular driver of the vehicle, such as described below.

Thus, the mirror casing is preferably angled or configured to accommodate the reflective element at the nominal setting (and is configured so that the bezel portion or face of the bezel of the mirror casing or shell is in a plane that is substantially parallel to the plane of the rearward surface of the reflective element when the reflective element is in the nominal or home position). Optionally, the mirror casing may be adjustable to set the nominal position, such as via a single ball or double ball mounting arrangement or assembly (such as shown in FIG. 1). Optionally, the system may determine the orientation of the mirror casing when manually adjusted and may adjust the setting of the reflective element relative to the mirror casing to provide the desired field of view memory setting to the driver even when the mirror casing has been adjusted or moved.

Optionally, the mounting structure and/or mirror casing may mount or attach to windshield via a conventional channel mount or mounting button (not shown), such as described in U.S. Pat. Nos. 5,820,097; 5,487,522; 5,671,996; 5,820,097; 5,615,857; 5,330,149; 5,100,095 and/or 4,930,742, which are hereby incorporated herein by reference in their entireties, which may provide a break-away mounting or release mechanism as is known in the art. Optionally, the mounting structure and/or mirror casing may mount to the windshield and/or headliner and/or overhead console or the like via other suitable mounting means, such as by utilizing aspects of the mounting elements described in U.S. Pat. Nos. 6,824,281; 5,487,522; 5,615,857; 5,671,996; 7,188,963 and/or 7,510,287, and/or U.S. Publication No. US 2006-0061008, which are hereby incorporated herein by reference in their entireties.

The reflective element may be attached to the mirror actuator, such as via an attaching plate or backing plate at a rear surface of the reflective element. The reflective element may comprise an electro-optic reflective element, such as an electrochromic reflective element or the like (such as the types discussed below), or may comprise a prismatic reflective element or the like (such as the types also discussed below), while remaining within the spirit and scope of the present invention.

The mirror casing may include a bezel portion that circumscribes a perimeter region of the front surface of the reflective element, or the perimeter region of the front surface of the reflective element may be exposed (such as by utilizing aspects of the mirror reflective elements described in International Publication Nos. WO 2010/124064; WO 2011/044312; WO 2012/051500; WO 2013/071070 and/or WO 2013/126719, which are hereby incorporated herein by reference in their entireties).

Optionally, and preferably, the reflective element may comprise a frameless reflective element, such as by utilizing aspects of the reflective elements described in U.S. Pat. Nos. 7,626,749; 7,360,932; 7,255,451; 7,274,501 and/or 7,184,190, and/or U.S. Publication Nos. US 2006-0061008 and/or US 2006-0050018, which are hereby incorporated herein by reference in their entireties. Optionally, and desirably, the reflective element may include a metallic perimeter band around the perimeter of the reflective element, such as by utilizing aspects of the reflective elements described in U.S. Pat. Nos. 7,626,749; 7,274,501; 7,255,451 and/or 7,184,190, and/or U.S. Publication No. US 2006-0061008, which are hereby incorporated herein by reference in their entireties. The metallic perimeter band may be selected to have a desired color or tint to match or contrast a color scheme or the like of the vehicle, such as described in U.S. Pat. Nos. 7,626,749 and/or 7,184,190, which are hereby incorporated herein by reference in their entireties.

The actuator thus is selectively operable to adjust the mirror reflective element relative to the mirror casing in a similar manner as actuators for conventional exterior rearview mirror assemblies. The actuator may be selected to provide lateral or side-to-side adjustment of the reflective element and/or vertical or up and down adjustment of the reflective element. Preferably, the actuator is operable to provide at least about 5 degrees of adjustment from a nominal position of the reflective element in each of the four axial directions (left, right, up and down) so as to provide substantial adjustment of the reflective element along both axes (horizontal and vertical), and more preferably, the actuator is operable to provide at least about 10 degrees of adjustment of the reflective element in each direction from a nominal position of the reflective element relative to the casing (in other words, the actuator may adjust the reflective element vertically and horizontally through a range of about 20 degrees along each axis). Thus, the reflective element may be adjusted to adapt the rearward field of view for the particular driver of the vehicle. Because the casing may be adjusted or formed or provided to support the reflective element at a nominal or pre-angled orientation such that the reflective element is canted about 22 degrees toward the driver side of the vehicle (relative to a longitudinal axis of the vehicle that extends along a direction of forward travel of the vehicle) and about 2-6 degrees downward (relative to a generally horizontal axis that is generally transverse to the direction of travel of the vehicle) when the casing is secured at the vehicle windshield (or elsewhere in or at the vehicle), such a 20 degree adjustment range (plus or minus 10 degrees from the nominal position) is sufficient to adapt the rearward field of view for most if not all potential drivers of the vehicle.

The actuator may be selectively operable in response to actuation of a user input or toggle switch or keypad or joystick or the like, whereby a user may press an arrowed button or directional keypad to adjust the reflective element toward the desired or appropriate or associated direction or angle. The user input may be located at a driver side door (or at the instrument panel and toward the driver side of the vehicle or at or on the steering wheel of the vehicle so as to be readily accessible and actuatable by the driver of the vehicle), and may be associated with control of the exterior rearview mirrors as well. For example, the user input may have a selector switch or buttons or the like that a user may actuate to select which mirror is being controlled (such as a three-way selector or multiple buttons or inputs for the user to select the appropriate mirror) and then the user may actuate the directional controls to adjust that reflective element. For example, a user may select a left switch position to set the input to control the driver side exterior mirror, a center switch position to set the input to control the interior rearview mirror, and a right switch position to set the input to control the passenger side exterior mirror. The user input may communicate the control signals to the interior rearview mirror assembly (and/or exterior rearview mirror assemblies depending on the selection switch) via a wire connection or via a wireless communication link, such as via various protocols or nodes, such as Bluetooth, SCP, UBP, J1850, CAN J2284, Fire Wire 1394, MOST, LIN and/or the like, depending on the particular application of the interior rearview mirror assembly and/or system of the present invention.

Optionally, the user input for directional control of the actuator (and/or actuators of the exterior mirrors as well) may be located at the interior rearview mirror assembly, such as at the bezel portion of the mirror casing. The user may then readily access the user input (such as a touch pad or joystick or the like) and actuate or touch the input or inputs to adjust the reflective element to provide the desired or appropriate rearward field of view. The user input may include a selector switch or input to allow the user to select which mirror is to be adjusted, whereby actuation of the user input may adjust the reflective element at the interior rearview mirror assembly or the reflective element at one of the exterior mirror assemblies. Because the bezel portion of the mirror casing may be fixedly or substantially fixedly secured relative to the vehicle, placement of the user inputs (or other user inputs or buttons or the like) at the bezel portion of the mirror casing will not result in mis-adjustment of the reflective element during actuation of or touching or pressing or contacting such user inputs. The user thus may press against or touch the user input or inputs at the bezel portion without such pressing causing undesirable movement of the bezel portion and the reflective element.

Optionally, and desirably, the actuator of the interior rearview mirror assembly may be operable in conjunction with the actuators of the exterior rearview mirrors of the vehicle and as part of a memory mirror system. For example, the actuator may be coupled to an electronic control system, which includes mirror-based control modules positioned at or in each exterior rearview mirror assembly and the interior rearview mirror assembly, and a vehicle-based control module that is interconnected to each of the respective mirror-based control modules. The control module may be located in the vehicle, such as, for example, in a vehicle door or in or behind the dashboard or the like. The control module or control may be operable to set the interior rearview mirror and one or more exterior rearview mirrors to a particular orientation (for example, a first or second memory position or orientation) in response to an input, such as a signal from a key fob or detection/recognition of a particular user of the vehicle or the like.

Optionally, and in addition to the above, the control module may be associated with other vehicle control functions such as seat position control, window controls, or the like. For further details of a suitable memory mirror electronic control system, reference is made to U.S. Pat. Nos. 6,698,905; 6,163,083; 5,798,575 and/or 5,796,176, which are hereby incorporated herein by reference in their entireties. Examples of suitable exterior rearview mirrors can be found in U.S. Pat. Nos. 6,163,083 and/or 5,798,575, the disclosures of which are herein incorporated by reference in their entireties. Reference is also made to U.S. Pat. Nos. 5,949,591; 5,879,074; 5,863,116; 5,871,275; 5,823,654; 5,669,699; 5,669,704; 5,624,176; 5,497,305; 5,786,772; 5,929,786 and/or 5,971,552, which are hereby incorporated herein by reference in their entireties, for other features that may be incorporated into the exterior rearview assemblies. Optionally, the reflective elements of the exterior rearview mirror assemblies may be controlled and/or may move in conjunction with movement of the reflective element of the interior rearview mirror assembly, such as in a master-slave fashion, such as by utilizing aspects of the mirror systems described in U.S. Pat. Nos. 6,867,510; 6,465,904; 6,904,348; 6,595,649 and/or 6,515,378, which are hereby incorporated herein by reference in their entireties. Optionally, the control circuitry and memory locations for the exterior mirrors and the interior mirror may be located/stored in the mirror casing of the mirror assembly, such as at or on a circuit board or the like located within the mirror casing.

Optionally, the reflective element may be mounted to the mirror actuator via stabilizer fingers or the like (such as are known in the art of exterior rearview mirror assemblies and such as are described in U.S. Pat. No. 5,818,650, which is hereby incorporated herein by reference in its entirety) to enhance the vibration performance of the reflective element. The stabilizer fingers function as springs at the outer perimeter of the reflective element to absorb vibration.

The mirror casing thus may be suitable for supporting larger or heavier components or circuitry that otherwise may not have been suitable for mounting or locating at or in a mirror casing. For example, the mirror casing may house or support a battery or power pack for various electronic features or components, and/or may support a docking station for docking and/or holding a cellular telephone or hand-held personal data device or the like, such as by utilizing aspects of the systems described in U.S. Pat. Nos. 6,824,281 and/or 7,306,376, and/or U.S. Publication No. US 2006-0050018, which are hereby incorporated herein by reference in their entireties.

As discussed above, the mirror assembly may comprise an electro-optic or electrochromic mirror assembly that includes an electro-optic or electrochromic reflective element. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/ or 4,712,879, and/or PCT Application No. PCT/US2010/ 029173, filed Mar. 30, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties.

Optionally, the mirror assembly may comprise a prismatic mirror assembly, such as a prismatic mirror assembly utilizing aspects described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism, or may comprise a prismatic reflective element of the types described in U.S. Pat. Nos. 7,420,756; 7,249,860; 7,255,451; 7,274,501; 7,289,037 and/or 7,338,177, which are all hereby incorporated herein by reference in their entireties, without affecting the scope of the present invention.

For applications with such prismatic reflective elements or other reflective elements of similar construction and/or functionality, it is envisioned that the mirror assembly of the present invention may include a user actuatable input or button or switch or toggle or the like for selectively switching or "flipping" the mirror between the day setting and the night or anti-glare setting. For example, a button or toggle or other input (such as touch sensor or proximity sensor or the like, such as described above) may be located at the mirror casing (and may be located at a lower region of the bezel portion so as to be generally at the location of a typical toggle or flip mechanism of a conventional prismatic mirror assembly) and a user (such as the driver of the vehicle) may selectively actuate the input to change the mirror setting. When the input is actuated, the mirror actuator automatically rotates or pivots the prismatic reflective element about a generally horizontal pivot axis to pivot or flip the reflective element between the day position and the night or anti-glare position. The input may comprise a button that causes the actuator to move the reflective element to the other position (for example, if the mirror reflective element is at the day setting when the input is actuated, the mirror actuator will pivot the reflective element to the night setting, or conversely, if the mirror reflective element is at the night setting when the input is actuated, the mirror actuator will pivot the reflective element to the day setting), or the input may comprise a toggle or two-way switch or two inputs, whereby the user selects or moves the input in a desired direction to change the day/night mirror setting. Optionally, the mirror assembly may include a manual toggle or switch that a user can actuate to pivot or flip the mirror reflective element between the day position and the night or anti-glare position.

Optionally, the mirror actuator may automatically pivot the mirror reflective element to change the day/night mirror setting when the conditions are appropriate for such change. For example, the mirror actuator may automatically change the mirror reflective element day/night setting in response to one or more photo sensors or glare sensors of the mirror assembly (such as glare sensors of the types used in connection with electrochromic mirror assemblies to cause automatic dimming of the electrochromic reflective element or cell). Thus, a prismatic reflective element may provide auto-dimming or auto-glare-reduction feature via the mirror actuator and associated controls and sensors.

Changes and modifications to the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
  a mounting structure configured to mount to an interior portion of a vehicle;
  a housing;
  a reflective element disposed at said housing;
  wherein said reflective element comprises a prismatic reflective element;
  wherein said housing and said reflective element are adjustable to provide a desired rearward field of view to a driver of the vehicle;
  an actuator disposed in said housing and connected to said reflective element;
  wherein said actuator comprises a first motor connected to said reflective element via a first drive element and a second motor connected to said reflective element via a second drive element;
  wherein, responsive to an input, said actuator is operable to adjust an orientation of said reflective element in tandem with said housing relative to said mounting structure; and
  wherein said first and second motors operate in tandem to adjust the orientation of said reflective element and said housing relative to said mounting structure;
  wherein, responsive to a glare sensor of said interior rearview mirror assembly, said actuator is automatically operable to adjust said reflective element and said housing about a generally horizontal axis to switch said reflective element between the daytime position and the nighttime anti-glare position; and
  wherein a control is operable to actuate said actuator to adjust said reflective element responsive to a driver monitoring system's determination of a location of the driver's head or eyes.

2. The interior rearview mirror assembly of claim 1, wherein said reflective element and said housing are adjustably mounted at said mounting structure at the interior portion of the vehicle.

3. The interior rearview mirror assembly of claim 1, wherein said housing includes an aperture and wherein said mounting structure is received through said aperture, said aperture providing clearance to allow for adjustment of said housing relative to said mounting structure.

4. The interior rearview mirror assembly of claim 1, wherein said actuator comprises (i) an actuator body that houses said first and second motors and (ii) an adjustment plate that is adjustable relative to said actuator body via actuation of said first and second motors.

5. The interior rearview mirror assembly of claim 4, wherein said actuator body is mounted to said mounting structure and said adjustment plate is disposed at the rear of said reflective element.

6. The interior rearview mirror assembly of claim 5, wherein said mounting structure comprises a ball joint for manual adjustment of said reflective element relative to said interior portion of the vehicle.

7. The interior rearview mirror assembly of claim 1, wherein said housing and said reflective element are manually adjustable to provide the desired rearward field of view to the driver of the vehicle.

8. The interior rearview mirror assembly of claim 7, wherein said housing and said reflective element are manually adjustable via a ball joint of said mounting structure.

9. The interior rearview mirror assembly of claim 1, wherein said first and second motors operate to extend said first and second drive elements to adjust said reflective element in a first direction.

10. The interior rearview mirror assembly of claim 9, wherein said first motor extends said first drive element and said second motor retracts said second drive element to adjust said reflective element in a second direction, and wherein said second direction is generally orthogonal to said first direction.

11. The interior rearview mirror assembly of claim 1, wherein said control adjusts said reflective element responsive to a determined change in location of the driver's head or eyes.

12. An interior rearview mirror assembly for a vehicle, said interior rearview mirror assembly comprising:

a mounting structure configured to mount to an interior portion of a vehicle;

a housing;

a reflective element disposed at said housing;

an actuator disposed in said housing and connected to said reflective element;

a control operable to control said actuator;

wherein said actuator comprises a first motor connected to said reflective element via a first drive element and a second motor connected to said reflective element via a second drive element;

wherein, responsive to an input, said actuator is operable to adjust an orientation of said reflective element in tandem with said housing relative to said mounting structure;

wherein said reflective element comprises a prismatic reflective element, and wherein, responsive to a glare sensor, said control is operable to actuate said actuator to adjust said reflective element about a generally horizontal axis to switch said reflective element between a daytime position and a nighttime anti-glare position;

wherein said control is operable to actuate said actuator to adjust said reflective element responsive to a driver monitoring system's determination of a location of the driver's head or eyes; and wherein said control actuates said actuator to adjust said reflective element responsive to a determined change in location of the driver's head or eyes.

13. The interior rearview mirror assembly of claim 12, wherein said reflective element is manually adjustable relative to said mounting structure at the interior portion of the vehicle.

14. The interior rearview mirror assembly of claim 12, wherein, responsive to a user input said control is operable to actuate said actuator to adjust said prismatic reflective element about the generally horizontal axis to switch said prismatic reflective element between the daytime position and the nighttime anti-glare position.

15. An interior rearview mirror assembly for a vehicle, said interior rearview mirror assembly comprising:

a mounting structure configured to mount to an interior portion of a vehicle;

a housing;

a prismatic reflective element disposed at said housing;

an actuator disposed in said housing and connected to said prismatic reflective element;

wherein said actuator comprises a first motor connected to said prismatic reflective element via a first drive element and a second motor connected to said reflective element via a second drive element;

wherein, responsive to an input, said actuator is operable to adjust an orientation of said prismatic reflective element in tandem with said housing relative to said mounting structure;

wherein said housing includes an aperture and wherein said mounting structure is received through said aperture, said aperture providing clearance to allow for adjustment of said housing relative to said mounting structure; and wherein, responsive to a glare sensor, a control is operable to actuate said actuator to adjust said prismatic reflective element about a generally horizontal axis to switch said prismatic reflective element between a daytime position and a nighttime anti-glare position; and wherein said control is operable to actuate said actuator to adjust said prismatic reflective element responsive to a driver monitoring system's determination of a location of the driver's head or eyes, and wherein said control adjusts said prismatic reflective element responsive to a determined change in location of the driver's head or eyes.

* * * * *

UNITED STATES PATENT AND TRADEMARK OFFICE
CERTIFICATE OF CORRECTION

PATENT NO. : 9,616,815 B2
APPLICATION NO. : 14/616772
DATED : April 11, 2017
INVENTOR(S) : Jake A. Mohan Page 1 of 1

It is certified that error appears in the above-identified patent and that said Letters Patent is hereby corrected as shown below:

In the Specification

Column 6
Line 26, "mirror" should be --minor--

In the Claims

Column 14
Line 21, "adiustable" should be --adjustable--
Line 32, "mounting structure; and" should be --mounting structure;--

Column 16
Line 9, "to a user input said" should be --to a user input, said--
Line 35, "structure; and" should be --structure;--

Signed and Sealed this
Sixteenth Day of October, 2018

Andrei Iancu
*Director of the United States Patent and Trademark Office*